(12) United States Patent
Zabolitzky et al.

(10) Patent No.: US 7,446,885 B2
(45) Date of Patent: Nov. 4, 2008

(54) DEVICE FOR MEASURING IN THREE DIMENSIONS A TOPOGRAPHICAL SHAPE OF AN OBJECT

(75) Inventors: John Zabolitzky, Munich (DE); Carl Smets, Heverlee (BE); Ludo Verluyten, Heverlee (BE); August Smeyers, Heverlee (BE)

(73) Assignee: ICOS Vision Systems N.V., Heverlee (BE)

(*) Notice: Subject to any disclaimer, the term of this patent is extended or adjusted under 35 U.S.C. 154(b) by 539 days.

(21) Appl. No.: 10/513,989

(22) PCT Filed: May 15, 2003

(86) PCT No.: PCT/BE03/00083

§ 371 (c)(1),
(2), (4) Date: Jun. 8, 2005

(87) PCT Pub. No.: WO03/098148

PCT Pub. Date: Nov. 27, 2003

(65) Prior Publication Data

US 2006/0087660 A1      Apr. 27, 2006

(30) Foreign Application Priority Data

May 15, 2002     (EP)     .................................. 02076972

(51) Int. Cl.
*G01B 11/24*     (2006.01)

(52) U.S. Cl. ...................................................... 356/601

(58) Field of Classification Search .................. 356/601
See application file for complete search history.

(56) References Cited

U.S. PATENT DOCUMENTS

| | | | |
|---|---|---|---|
| 5,184,021 A * | 2/1993 | Smith | 250/559.19 |
| 5,737,084 A | 4/1998 | Ishihara | |
| 6,108,090 A * | 8/2000 | Ishihara | 356/601 |
| 6,369,928 B1 * | 4/2002 | Mandella et al. | 359/204 |
| 6,371,637 B1 | 4/2002 | Atchison et al. | |
| 6,396,589 B1 * | 5/2002 | Ebihara | 356/601 |
| 6,697,163 B2 * | 2/2004 | Fukuda et al. | 356/609 |

FOREIGN PATENT DOCUMENTS

| | | |
|---|---|---|
| EP | 485 803 | 6/1992 |
| EP | 679 864 | 11/1995 |

* cited by examiner

*Primary Examiner*—Tarifur R. Chowdhury
*Assistant Examiner*—Isiaka O Akanbi
(74) *Attorney, Agent, or Firm*—Sughrue Mion, PLLC (57) ABSTRACT

A device for measuring in three dimensions a topographical shape of an object. The device comprises an arrayed confocal imaging system having a confocal topographical mask provided for converting light produced by a light source into an array of small spots. The mask being mounted on a scanning member provided for moving the mask over successive positions over a predetermined distance. The device further comprises a confocal objective provided for mapping at successive object-position-in-focus the array of small spots output at said successive positions. The confocal objective may be mounted at a fixed position within said device.

18 Claims, 8 Drawing Sheets

| i | p | A | B | C | D | E | F | Z | J |
|---|---|---|---|---|---|---|---|---|---|
| 0 | 0 | 0 | 0 | 0 | 0 | 0 | 0 | 0 | 0 |
| 1 | a | 0 | 0 | a | 0 | 0 | 0 | a | 1 | 2 |
| 2 | b | 0 | a | b | 0 | 0 | a | b | 2 | 2 |
| 3 | c | a | b | c | 0 | 0 | b | c | 3 | 2 |
| 4 | d | a | b | c | d | 0 | c | d | 3 | 1 |
| 5 | e | a | b | c | d | e | d | e | 3 | 0 |
| 6 | f | a | b | c | d | e | e | f | 3 | 0 |
| 7 | g | a | b | c | d | e | f | g | 3 | 0 |
| 8 | h | f | g | h | d | e | g | h | 8 | 2 |
| 9 | j | f | g | h | j | e | h | j | 8 | 1 |
| 10 | k | f | g | h | j | k | j | k | 8 | 0 |

Table 1  Fig. 10

DEVICE FOR MEASURING IN THREE DIMENSIONS A TOPOGRAPHICAL SHAPE OF AN OBJECT

BACKGROUND OF THE INVENTION

The present invention relates to a device for measuring in three dimensions a topographical shape of an object, said device comprising an arrayed confocal imaging system having a light source provided for illuminating said object and a light path diverging optical element, provided for diverging a path of illuminating light output by said light source and a path of reflected light reflected by said object, said confocal imaging system further comprises a confocal topographical mask provided for converting illuminating light coming out from said light path diverging optical element into an array of small spots, said confocal imaging system further comprises a confocal objective provided for orienting said illuminating light towards said object and said reflected light towards said confocal topographical mask in order to form a confocal image, said device further comprises a photoelectric sensor member provided to receive said reflected light having passed said confocal topographical mask and deflected by said light path diverging optical element and to convert the latter light into an intensity value, said device comprising also a scanning member on which said confocal topographical mask is mounted, said scanning member being provided for moving said confocal topographical mask over successive positions over a predetermined distance in order to modify a relative distance in a predetermined direction between said object and the object-position-in-focus, said device further comprises an image processor connected to said photoelectric sensor member and provided for forming a confocal response signal and calculating said object shape from said confocal images acquired at different relative distances in said predetermined direction between said object and the object-position-in-focus by said photoelectric sensor member, said confocal objective being provided for mapping at successive object-position-in-focus said array of small spots output at said successive positions.

The invention also relates to a method for measuring in three dimensions a topographical shape of an object.

Such a device and method are known from EP-A-0679864. In the known device and method the light source outputs a path of illuminating light which crosses the light path diverging optical element formed by a hologram and a lens array and reaches the confocal topographical mask comprising a pinhole array. The path of illuminating light which is formed by an array of small spots after passing the mask, ends at the object to be measured. At the location of the object the incident light spots are reflected and the reflected light crosses the mask to reach the light path diverging element. The latter deflects the reflected light towards the photoelectric sensor member, where the incident light is sensed and further processed by the image processor in order to determine a three dimensional shape of the considered object. In order to determine the third dimension, means are provided for modifying the relative distance in the z-direction between the object and the object-position-in-focus. In the known device, the latter means are formed by a set-up comprising a scanning member on which the confocal topographical mask, the light path diverging optical element, the sensor members and the confocal objective are mounted. The movement of the whole set-up in the z-direction causes the object-position-in-focus to shift in the z-direction over a predetermined distance. Accordingly the relative distance in the z-direction between the object and the object-position-in-focus changes, thus enabling to determine the third dimension.

A drawback of the known device and method is that the confocal topographical mask as well as the light path diverging optical element, the sensor members and the confocal objective are all moved together in the z-direction in order to modify the relative distance between the object and the object-position-in-focus. The movement of such a relatively heavy set-up requires some power and is not the most appropriate choice for high speed on-line determination.

SUMMARY OF THE INVENTION

It is an object of the present invention to realise a device and/or a method for measuring, in three dimensions, a shape of an object, which device uses an arrayed confocal imaging system operative at high speed and enabling a fast measurement.

For this purpose, a device according to the present invention is characterised in that said confocal objective is a 3D confocal objective mounted at a fixed position within said device. By using a fixed 3D confocal objective only the topographical mask is moved over the successive positions. Since the topographical mask is much lighter than the whole set-up, the movement requires much less power than the one according to the prior art. Consequently a faster movement is achieved which is more suitable for high speed on-line determination. It should be noted that the prior art does not suggest the skilled person to keep the confocal objective fixed. On the contrary, the alternative embodiment illustrated in FIG. 11 of the prior art teaches to keep the mask fixed and to move a part of the confocal lens. Starting from this prior art, the skilled person is thus led away from fixing the confocal objective.

Preferably said 3D confocal objective is being designed in such a manner as to limit spherical aberration and coma in order to keep imaging errors in said confocal images at a maximum of two pixels. In order to obtain a good image quality at the level of the image processor, some constraints have to be imposed on the confocal objective. These constraints are met by setting a limit to the spherical aberration and coma of the confocal lens.

A first preferred embodiment of a device according to the invention is characterised in that said confocal topographical mask is formed by a microlens array mounted on said scanning member and said device further comprises a single pinhole located at a focal point of said photoelectric sensor member.

Preferably said illumination source comprises a high-density LED array with a further microlens bonded on top of it. In such a manner sufficient light intensity is provided.

A second preferred embodiment of a device according to the present invention is characterised in that a linear polarizer is applied into said light path at an illumination side of said diverging optical element on which other side a quarter-wave plate and an analyser are applied. In such a manner "noise" light originating from reflections which do not contribute to the reflected light to be measured, is considerably reduced.

A third preferred embodiment of a device according to the present invention is characterised in that said scanning member comprises a scanning signal generator provided for generating a series of scanning signals indicative of said successive positions, said scanning signal generator being connected to said image processor for supplying said scanning signals thereto, said photoelectric sensor member comprising a first array of sensing elements, said image processor comprises a second array of processing elements, each processing element of said second array being each time connected to a number of sensing elements of said first array, said image processor being provided for receiving each time within a same series of scanning signals successive ones of said intensity values, each of said processing elements being provided for differentiating said successive intensity values among each other and retaining those intensity values forming said confocal response signal, said image processor being provided for associating to those intensity values forming said confocal response signal, those scanning signals representing those positions having led to said confocal response signal. By supplying the scanning signals to the processing elements, the latter operate synchronously with the scanning member, thus enabling a fast processing. The presence of a first array of sensing elements and a second array of processing elements enables to split the sensing of the incident light and the processing of the sensed light, thus increasing the total process speed and making the device even more suitable for a fast measurement. By differentiating the intensity values, the confocal response signal can be retained as it has the highest intensity value. The amount of data to be processed is therefor reduced. The shape of the object can quickly be determined, since the scanning signal, corresponding to the highest value, is easily recognised due to the synchronous operation of the scanning member and the image processor.

A fourth preferred embodiment of a device according to the invention is characterised in that a sampling member is mounted between said first array of sensing elements and said second array of processing elements, said sampling member being provided for sampling at a predetermined sampling rate, intensity values generated by said sensing elements and output at parallel read-out gates thereof, each of said processing elements having a memory element provided for storing each of the intensity values sampled within a same series of scanning signals, each of said processing elements being provided for determining a maximum intensity value by interpolating the intensity values stored each time in a same one of said memory elements. This enables to reduce considerably the amount of intensity values to be treated without substantially affecting the reliability.

A fifth preferred embodiment of a device according to the present invention is characterised in that said first and second array have at least a same number of elements, each processing element being provided for storing as a stored intensity value in an associated memory element an initial intensity value, said processing elements being provided for comparing, under control of each of the subsequent scanning signals, if the current intensity value is higher than the stored intensity value and for overwriting the stored intensity value if the latter is lower than the current intensity value, said processing elements being also provided for storing upon each storage operation the current one of the scanning signals. The highest intensity value is easily and quickly as well as reliably determined.

Preferably said scanning member comprises a voice-coil actuator connected to said confocal topographical mask and is provided for imposing a vertical movement to said mask. A voice-coil actuator enables a precise and reliable movement of the mask.

The invention will now be described in more detail with reference to the drawings, showing different embodiments of a device according to the present invention.

BRIEF DESCRIPTION OF THE DRAWINGS

In the drawings.

In the drawings a same reference number has been assigned to a same or analogous element.

DETAILED DESCRIPTION OF THE INVENTION

The present invention relates to a device and also a method for measuring, in three dimensions, a topographical shape of an object, i.e. 3D surface profiles, with a speed compatible to the one used in industrial manufacturing processes. For on-line applications within a manufacturing process, the time allotted for such a measurement is about 0.1 sec and preferably less. The objects to be measured generally have dimensions xyz=50×50×3 mm, wherein z indicates the height direction. The required accuracy is in the few micron range, in particular when electronic components are considered. It will however be clear that the present invention is not limited to the examples given here before. Nevertheless and for the sake of clarity, the referred example will be used throughout the description.

The device according to the invention comprises an arrayed confocal imaging system. The basic principle of a confocal imaging system is described in "confocal scanning optical microscopy and related imaging systems" of T. R. Corle and G. S. Kino published by Academic Press 1996. A light point source, defined by a pinhole, is used to illuminate the object through an objective. The light reflected from a point on the object is imaged by the objective back to the pinhole. If the pinhole and the spot on the sample point are at their confocal points, the reflected light is efficiently passing the pinhole to a detector located at the other side. If the object moves out of focus, the confocal relation is not valid and the reflected light is defocused at the pinhole and hence does not pass through it to a detector located on the other side.

The confocal imaging system is independent of details of the surface profile, structure, texture, roughness, reflectivity or colour variation and enables to be implemented without mechanical xy scanning. Instead of changing the optical path distance between the object surface and the objective, the device according to the invention keeps the optical path distance fixed but let a confocal topographical mask move up and down in the z-direction. Furthermore, the device uses a 2D image sequence sensing and processing by means of a photoelectric sensor member, preferably using CMOS technique and an image processor.

A basic problem overcome by the present invention is to deal with an enormous data rate. As a numerical example, assume 1000×1000 parallel confocal array in xy. In order to achieve few micron accuracy around 1000 or at least 100 images sectioning the 3 mm z interval stated above are needed. In order to achieve the maximum time of 0.1 sec, one needs to acquire and process said 100 to 1000 images within these 0.1 sec, i.e. there should be dealt with a rate of 1,000 to 10,000 images/sec or more, each image comprising 1 M pixels. This is a data rate of 1-10 billion pixels per second minimum, preferably more. The present invention presents a system capable of acquiring and processing the images with this data rate.

Figure 1:
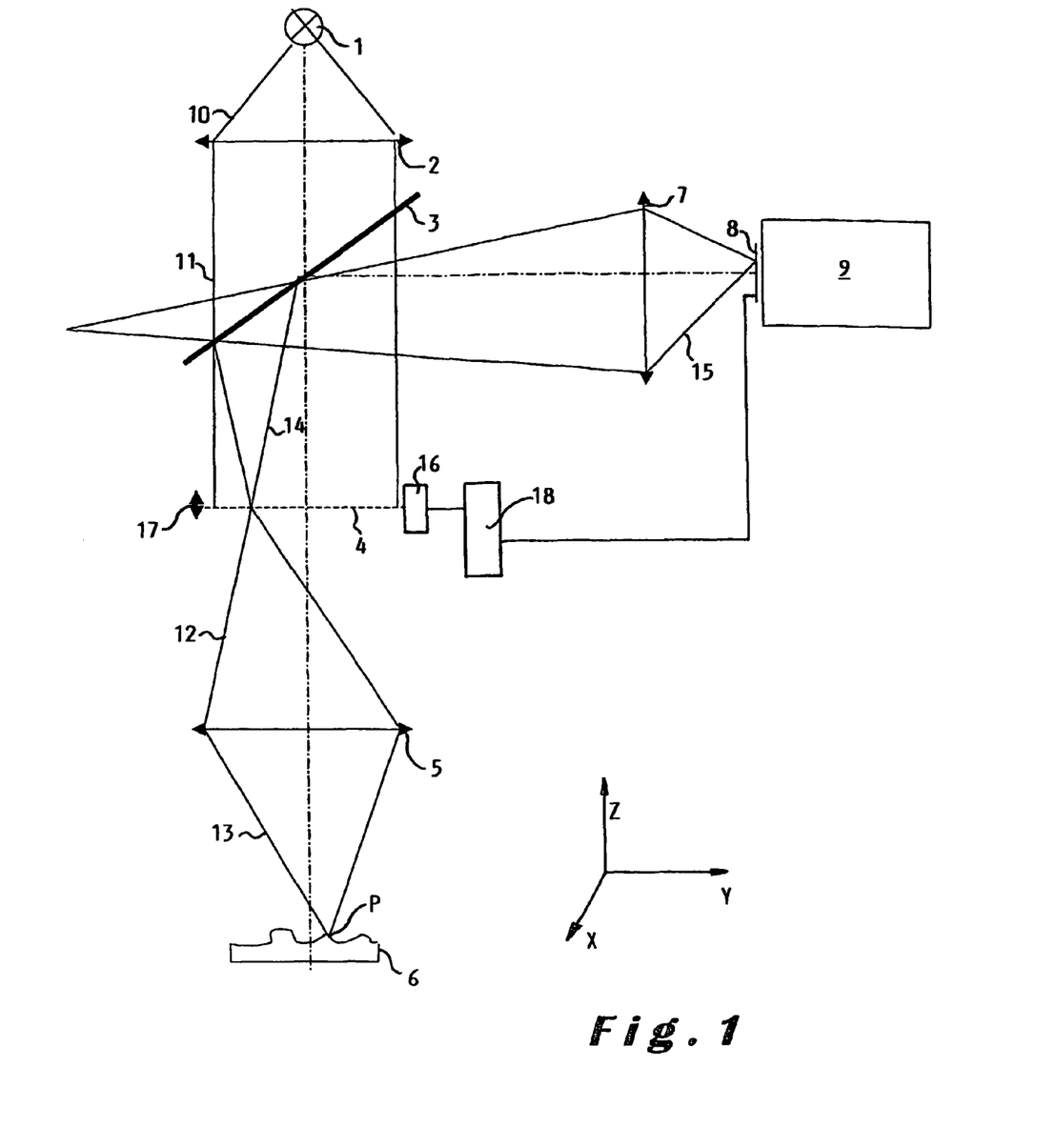
FIG. 1 illustrates the optical principle as used in the device according to the invention.

FIG. 1 illustrates the optical principle as used in the device and method according to the invention. A light source 1 emits a light beam 10 provided for illuminating an object 6. The light beam 10 crosses first a projection objective 2, provided to convert the light beam 10 into a parallel illuminating light beam 11. A light path diverging optical element 3, for example formed by a beamsplitter, is placed into the light path of the illuminating light beam 11 and is provided for diverging the light path of beam 11 and a path 14 of light reflected by the object. As can be seen in FIG. 1, the illuminating light beam 11 is not affected by element 3.

The illuminating light beam 11 illuminates in a homogeneous manner a pinhole array 4, which is part of a confocal topographical mask, provided for converting the illuminating light beam 11 leaving element 3 into an array of small spots. The pinhole array 4 comprises a plurality of pinholes, for example a quadratic matrix of 1000×1000 pinholes, each having a diameter of 5μ on a 50×50 mm plane i.e. with a pitch of 50 μ. The small spots emerging from each of these pinholes (for the sake of clarity only a single spot has been designed) is focused by means of a large aperture objective 5, in such a manner, that a focused beam 13 is incident on the object 6. Since those small spots are incident on the objective 5, the latter maps them on the object. This objective 5 preferably has telecentric properties to obtain identical illumination properties across the objects xy-dimensions (horizontal orientation within the drawing). If the z positions (vertical position within drawing) of pinhole array 4, objective 5 and a surface point on the object 6 are such that the arrangement is confocal, i.e. a spot is mapped onto a sharp point at the specific object surface location, a large amount of the reflected light from the object surface 6 travels back the identical path, i.e. 13 and 12, into the original pinhole. The light beam 14 emerging from the other side of the pinhole 4 is deflected by beamsplitter 3 into a camera objective 7. The light is then focused 15 onto the photoelectric sensor member. The sensor 8 is controlled and read out by image processor electronics 9.

Figure 2:
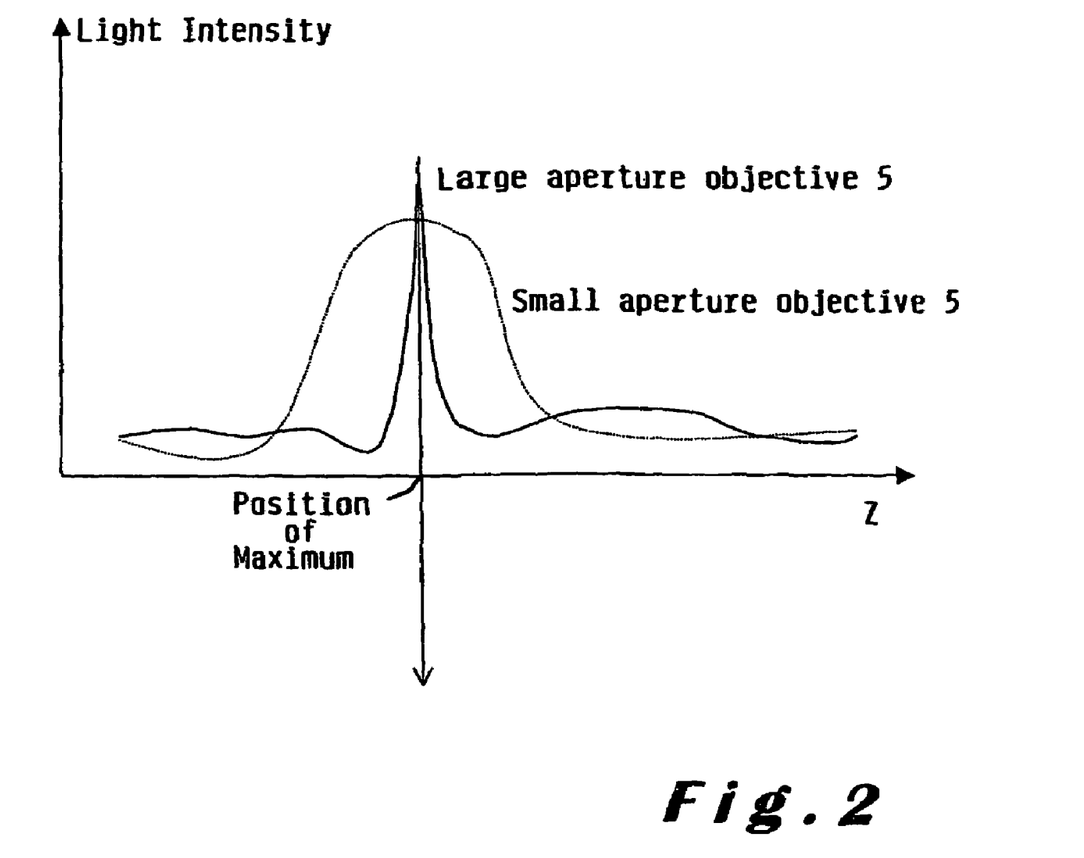
FIG. 2 illustrates the light intensity of the reflected light incident on the sensor member as a function of the movement of the mask for one sensing element.

If due to the surface profile of object 6 there is no surface at the position of focal point, only very little light will be reflected back into the pinhole by the out-of-focus surface area 6. Therefore, the pixel within sensor 8 will receive maximum light and form the confocal response signal at that relative location of pinhole array 4, objective 5, and surface 6, where the confocal relation is met (confocal optical principle). This is illustrated by the solid line shown in FIG. 2.

In order to obtain the third dimension it will be necessary to modify in a predetermined direction (the z-direction in the illustrated example) the relative distance between the object 6 and the object-position-in-focus.

Those means for modifying the relative distance comprise a scanning member 16 on which the confocal topographical mask 4 is mounted. The scanning member 16 enables an up and down movement, shown by arrow 17, of the mask or pinhole array. The scanning member therefor moves the mask over successive positions in the predetermined direction and over a predetermined distance of for example 3 mm.

It has to be noted that in the device or method according to the present invention only the confocal topographical mask 4 is moved during the scanning movement. The other components such as the objective remain fixed.

The scanning member further comprises a scanning signal generator 18 provided for generating a series of scanning signals indicative of the successive positions reached by the mask during its movement. The different scanning signals within a series of scanning signals thus represent the different positions. The scanning signal generator is further connected to the sensor member and the image processor in order to supply the scanning signals to them.

As can be seen in FIG. 1, the objective 5 is placed downstream, considered in the illuminating path direction of the moving mask. Since the mask moves, the array of small spots output by the mask will also move in the predetermined direction. The objective 5 will thus map the different small spots at different height onto different object-in-focus-positions of the object.

An advantage of changing the optical distance between the confocal lens 5 and the mask 4 by means of the scanning member, is that the mask has a lower mass than for example the Nipkow disc described in U.S. Pat. No. 5,737,084. This lower mass enables a higher acceleration resulting in a faster linear movement instead of a rotation. Moreover, the device according to the invention is easier to build because the working distance between the confocal lens 5 and the object 6 remains fixed, since the confocal lens 5 remains fixed within the device. The scanning member is fully enclosed in the device and the confocal lens can easily be changed for changing the field of view.

In the present embodiment, the scanning member is for example formed by a voice-coil actuator. Due to the small mass of the pinhole array, a fast movement is possible. Therefore, several mm may be traversed within only a few milliseconds. This implements the fast z-scanning required for in-line measurement in order to achieve fast measurement times. Since a smaller aperture objective 7 is used, all of the movement of pinhole array 4 remains within the depth of focus, so that the collection of light into sensor pixel 8 is not affected by this movement.

The pinhole array undergoes preferably a continuous up or down movement, and each scanning signal within that series corresponds to a particular z-position of the pinhole array 4.

An illuminating light beam 10, output by the light source, will thus cross the projection objective 2 and the beamsplitter 3 in order to reach the mask 4. A spot belonging to light beam 12 and leaving one of the pinholes will be focused by the objective 5. If the actual position of the mask 3 during its movement and the point P on object 6, on which the focused spot is incident, are in focus, the focused spot will be totally reflected in point P. If on the other hand they are not in focus, only a small amount or even no light will be reflected. The reflected light will then be diverged by the beamsplitter 3 and reach the objective lens 7 and the sensor member 8.

Considering a fixed pixel within sensor member 8, the light intensity seen by this pixel will thus generally be very low. As an exception, when the confocal condition between the z-positions of pinhole array 4, objective 5, and surface 6 is met, the confocal response signal will be formed because there will be a maximum of light seen in this pixel. By recording the position of the pinhole array 4 at the point in time where a maximum light intensity is observed by the sensor pixel 8, a measurement of the corresponding z co-ordinate of surface point P is achieved. The intensity as a function of z-position 16 seen by a given pixel could look like the solid line shown in FIG. 2.

Instead of using a pinhole array for the confocal topographical mask 4, it is also possible to place a microlens in each pinhole, facing the side of the light source. This would improve the light efficiency of the device. The microlenses would focus all incident light into the pinholes and collimate all light returning through the pinholes into the sensor direction. Insufficient collimated light, light incident between the microlenses or noise light reflected by the object or optical elements downstream of the pinhole array could be blocked by the latter array.

Figure 3:
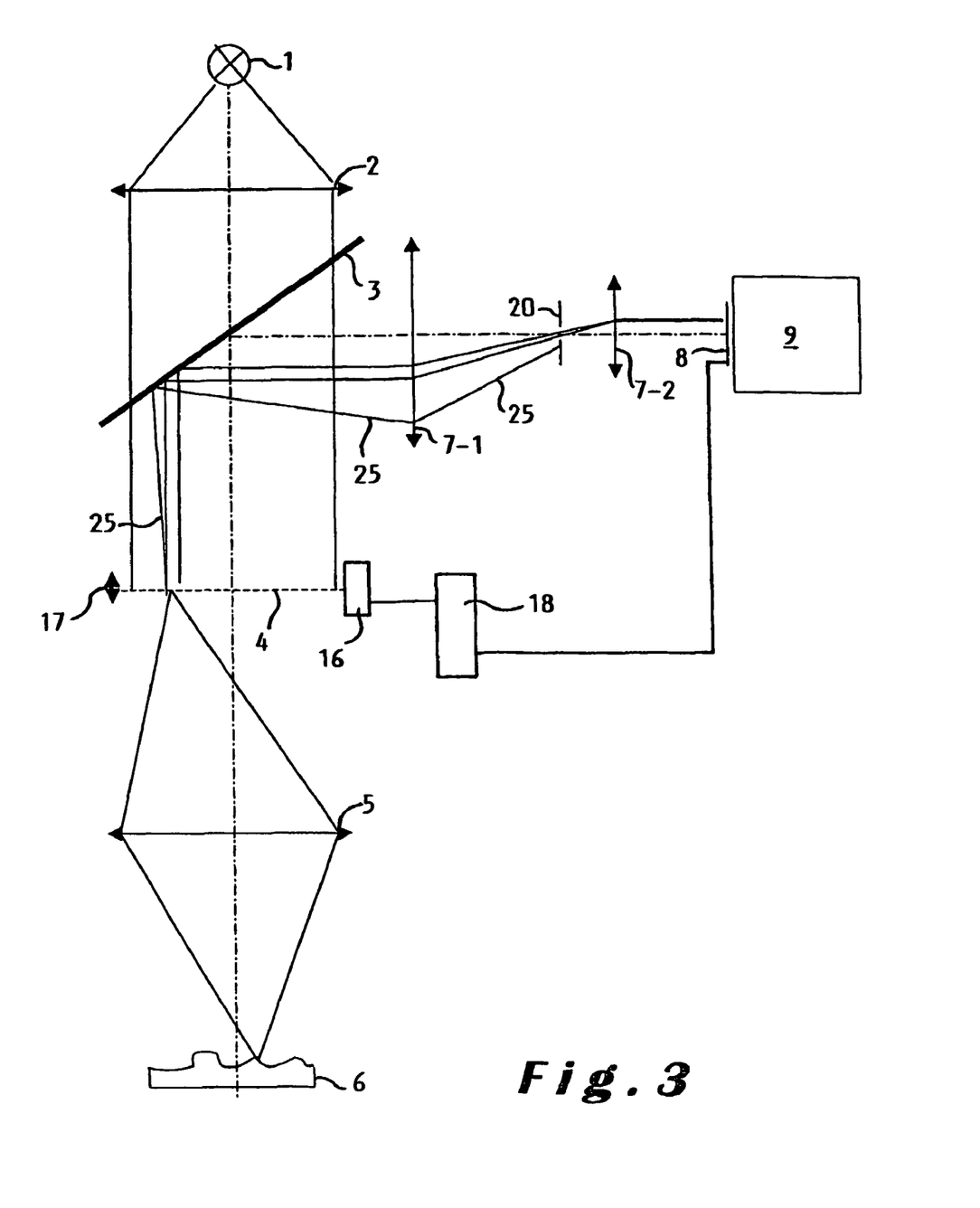
FIG. 3 illustrates schematically the device where the mask is formed by a microlens array and a single pinhole.

According to an alternative embodiment the confocal topographical mask is formed by a microlens array at the position of the pinhole array 4. In this embodiment a single pinhole 20 is located at the focal point of the camera objective 7-1 and 7-2, as shown in FIG. 3. Any ray of light 25 not passing through the microlens' focal point would hit that single pinhole plate 20 outside the pinhole and not reach the sensor. For the purpose of this discussion, the camera objective, FIG. 3, is imagined as a two-stage objective, the first half 7-1 imaging onto the focal point and the second half 7-2 from the focal point to the sensor member 8 (telecentric objective). The limited aperture of this objective replaces the function of the array of pinholes at the microlens plate. If microlenses are used, the pinhole array could be omitted since the small acceptance range of the microlenses arising from the small numerical aperture of the illumination/camera objectives would serve as effective pinholes.

As explained in the latter section, the light source defining light filtering and detecting element defined by microlenses, eventually combined with additional pinholes, can have many (static and non-static) configurations of which a few have been described. It is used as a scanning member to determine the confocal topography of the object's surface.

The confocal objective 5 has to be suitable to operate over the whole optical scan such as realised by the scanning member over a 3D volume with a depth of about 3 mm in order not to affect the image quality. This requires an appropriate designed lens 5, which is capable to keep lens distortions low within a 3D volume. Lenses are usually designed for optimal distortions within a 2D-plane orthogonal to the optical axis and at a fixed optical distance from the lens. Scanning an object's surface is therefore mostly done by moving the object in the z-direction or by changing the optical distance between object and objective lens.

The confocal objective 5 used in the device or method according to the present invention is therefor formed by a 3D confocal objective. Sharp imaging of a flat 2D object requires the fulfilment of the Abbe sine condition. In ideal paraxial geometrical optics an infinite object volume can be adequately mapped into an infinite image volume. However this property can not be maintained for larger numerical apertures, except for a magnification equal to one. These conditions are described in the article "The Abbe sine condition and related imaging conditions in geometrical optics" of Joseph Braat, Fifth International Topical Meeting on Education and Training in Optics, Delft, 1997. The latter article being incorporated by reference within the present description.

In order to achieve a suitable large 3D volume imaging at larger numerical apertures, it would be necessary to comply with the Abbe sine condition as well as with the Herschel condition. This is however contradictory except for the case of magnification equal to one. For practical purpose however some spherical aberration is acceptable.

Detailed numerical simulation shows that up to magnification of +/−5 and numerical apertures of +/−0.3, the spherical aberration and coma can be kept sufficiently small in order to keep imaging errors up to a maximum of two pixels at the level of the sensor.

Referring back to the Braat article, the constraints to be imposed on the 3D confocal lens 5 can be derived by optimising the axial and lateral extent of the imaging volume as expressed in equation (19) of the article, in such a manner that coma and spherical aberration remain within the set limit. The optimisation can be achieved by computer simulation. The parameters which are available for tuning are the maximum numerical aperture and the wavelength of the used light source. A larger wavelength is favourable in order to maximise the imaging volume of a 3D confocal objective.

Figure 9:
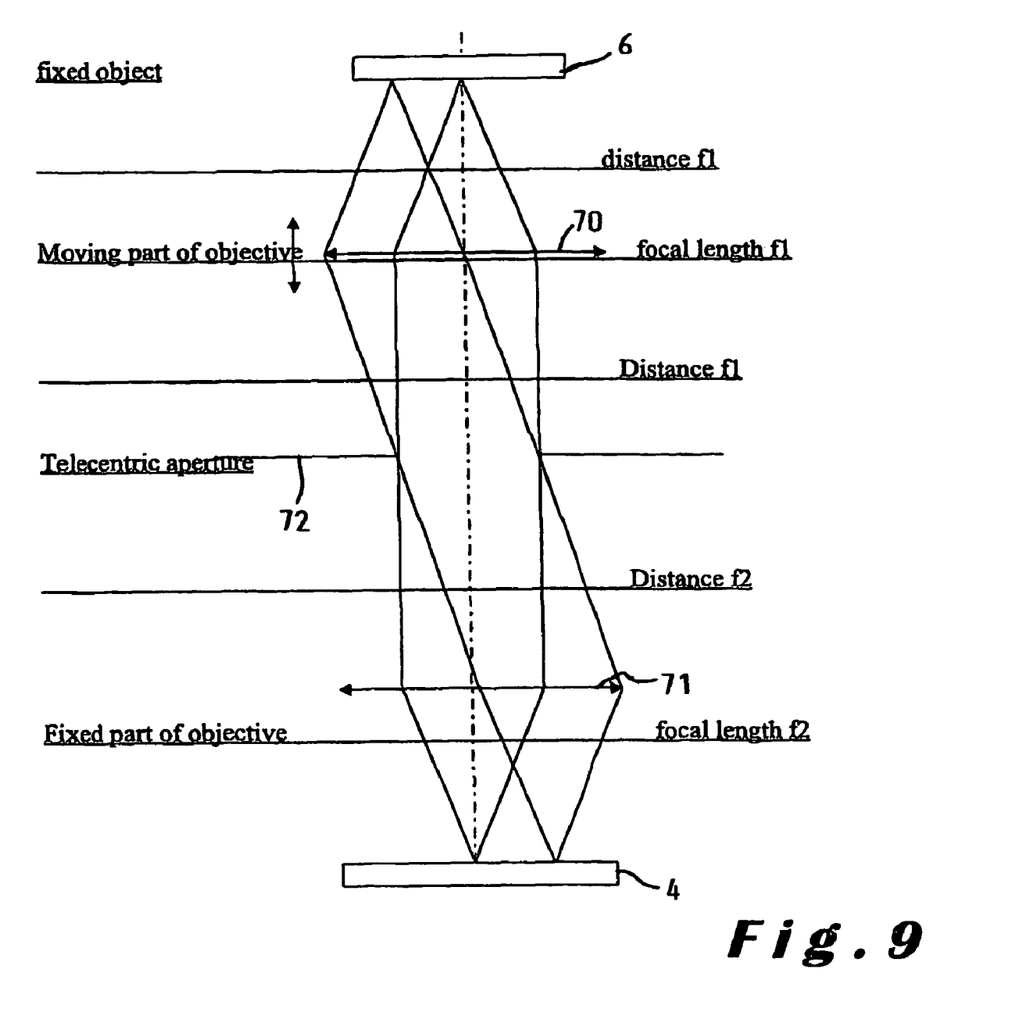
FIG. 9 illustrates schematically an objective as a component of the device where use is made of a two-part objective.

An alternative embodiment consists of using a set of two 2D-optimized standard lenses and fixed positions for the microlens plate 4 and the object 6. Such a two stage confocal lens is shown in FIG. 9 and comprises a moving part 70, having a focal length f1, and a fixed part 71, having a focal length f2, with a telecentric aperture 72 in between. Such a set-up is able to scan the object's surface by moving the lens 70 closest to the object i.e. by changing the optical distance between the object and the lens 70. The light reflected back from the object's surface is converted into a collimated beam by this lens 70. This collimated reflected beam can be imaged by the second lens 71, fixed in position, onto the fixed microlens plate 4. Advantages of such a confocal lens set-up are that a very simplified optical design (standard 2D optimized lenses can be used) is obtained when compared with a single 3D confocal lens, a fixed object position and fixed microlens position. This is however at the expense of a higher mass which has to be moved and which movement is outside the device and is therefor exposed to the environment. Furthermore, it is more difficult to exchange the lenses if for example different field-of-views would be required.

In the embodiment shown in FIG. 9 the confocal topographical mask is formed by a microlens array comparable to the one illustrated in FIG. 3. Consequently with the embodiment of FIG. 9, an analogous set-up as the one illustrated in FIG. 3, is chosen for the camera objective (not shown), i.e. a single pinhole located between a two-stage objective.

The device is very demanding regarding light energy. The amount of light to be supplied increases with the speed at which the object is displaced, i.e. shorter exposure times, and with the volume to be inspected. Furthermore, the amount of "signal" light i.e. the light reflected from the surface of the object and reaching the sensor member 8 by the optical path designated by 13, 12, 14 and 15, strongly depends on the reflective properties of the object. The required maximum amount of light power for the collimated light beam 11, taking into account light losses at various components of the optical path, can be of the order of a few tens of Watt under the above mentioned requirements of inspection speed and volume. Due to the requirement for very low stand-still times, the integration time at which the sensor member has to operate is short, so a high light intensity is required to overcome this problem.

A common light source used in the prior art is a Halogen bulb. However, an extremely intense light source (several hundreds of Watt) would be required to deliver the required light energy. Only a small part of the emitted light can be used to produce a proper collimated light beam 11. In order to provide well-defined focal points at the microlenses 4, the numerical apertures of the illumination optics as well as the camera optics should be rather small, around 0.01. Such highly inefficient light source would suffer from low operating lifetime.

Another alternative design for a light source 1 would be a high-density LED array. This is manufactured by means of bonding bare LED dies onto a substrate, which in turn is bonded onto a heat sink. In this manner a very large number, e.g. 10,000 LED dies can be put into a 50 mm by 50 mm area, providing the very large light intensity required. To increase the light efficiency of this source a second microlens plate can be bonded atop the LED array, using a transparent adhesive or molding substance. This would serve to collimate a larger fraction of the light emitted by the LEDs in the measurement path.

A third alternative light source, providing even higher light intensities and efficiencies is an array of laser diodes with the light coupled into a fibre-optic bundle. The other end of the bundle would serve as a high-intensity light point source, which can effectively be converted into a properly defined collimated beam. Laser speckle is however a disadvantage introduced by most common laser sources. The coherence of the light output source can be reduced by using an array of individual gain-guided diode laser sources, by allowing controlled but relatively large temperature variations of the lasing media (resulting in a broader wavelength range) and coupling the light into a fibre bundle, which allows efficient mixing of the different light ray path lengths.

Other possibilities to further reduce the coherence of the light emitted by the source would be a current modulation applied to the laser diodes to induce mode-hopping or by attaching a piezo- or voicecoil vibrator to the fibre bundle and shake it. This continuous movement of the fibre bundle would also change the path lengths of the light rays. The frequency range is selected such that sufficient averaging is obtained during the time that one z-slice is recorded. During the image exposure time, i.e. during the recording of one complete movement of the scanning member, the voice-coil actuator 16 moves continuously in the z-direction. The image is formed by light integration in the camera 8, 9 and this, itself, already constitutes a phase averaging.

Figure 4:
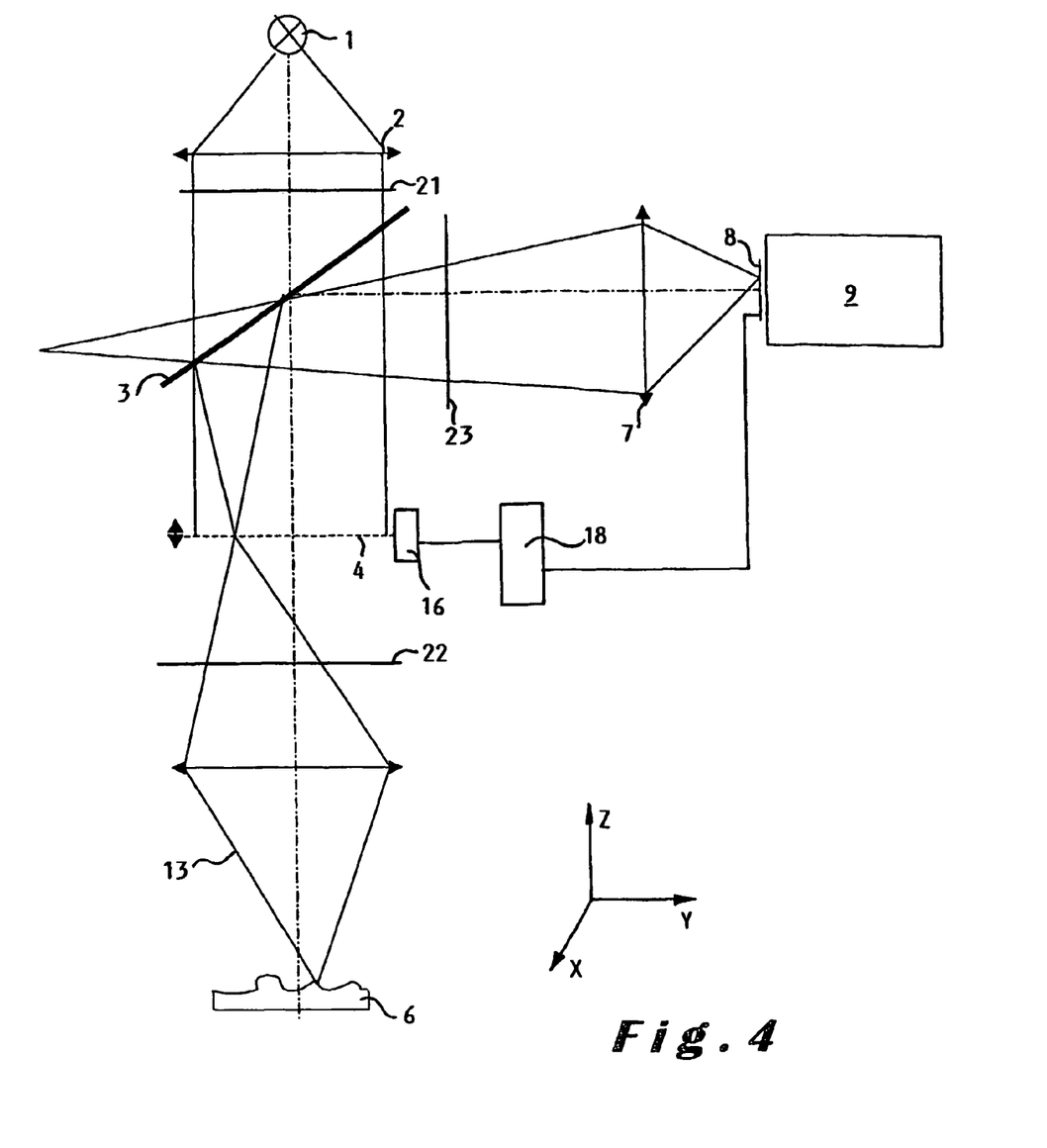
FIG. 4 illustrates schematically the device where use is made of a polariser, a quarter-wave plate and an analyser.

A major source of "noise" light consists of unwanted reflections from the various elements in the optical path. A significant portion of the noise light originates from the reflection at the microlens and/or pinhole array 4. This source of noise light can be eliminated as illustrated in FIG. 4 by using a linear polariser 21 in the illumination path following the objective 2 a quarter-wave (λ/4) plate 22 on the object side of pinhole array 4 and an analyser 23 in the camera light paths. The polariser 21 is positioned at the illumination side of the beamsplitter 3. It produces linearly polarised light, e.g. in the y-direction.

The beamsplitter can be optimised by means of a proper optical coating to be highly transmissive for light polarised in the y-direction and strongly reflective for light polarised in the x-direction. Reflection preserves the polarisation direction. Reflected light from optical elements downstream of the polariser 21 and before the quarter-wave plate 22 is linearly polarised in the y-direction. Because the beamsplitter is made highly transmissive for this polarisation, it will not significantly reflect towards the camera 8, 9.

The linear analyser 23 in front of the camera, having optimal transmission properties for light polarised in the x-direction, will further reduce the light with this polarisation. Light reflected from the surface of the object is circularly polarised by the quarter-wave plate 22. Part of this light travels back along the path 13 and will pass the quarter-wave plate a second time but in opposite direction. The signal light will undergo a polarisation change from circular to linear in the x-direction. The beamsplitter 3 will efficiently reflect this light towards the camera 8, 9. The reflected light has the proper orientation in polarisation to pass the analyser with minimal attenuation. This set-up (polariser, beamsplitter, quarter-wave plate and analyser) would serve to reduce unwanted reflections directly from the illumination side of the microlens array or pinhole array 4 into camera 8, 9 and enhance the signal-to-noise ratio. Polariser and analyser could be combined within the beamsplitter 3.

Further reduction of unwanted reflection can be achieved by:

arranging the various optical elements with a small deviation from perpendicular to optical axis;

by applying anti-reflective coatings to the optical elements.

Another source of noise is cross-talk between light from neighbouring pinholes or microlenses. Its effect can e.g. be reduced by the use of a small aperture objective 7 in front of the camera.

Returning to FIG. 1, the processing of the light reflected by the object 6 is realised by the sensor member 8 and the associated image processor 9. Although the operation of the sensor member 8 and the image processor 9 will be described by referring to reflected light obtained as described here before, it will be clear that the sensor member and the image processor could also be used for processing reflected light obtained by another confocal imaging system. The sensor member and the image processor have to deal with the reflected light leaving each of the pinholes or microlenses of the mask 4. In the numerical example of a 1000×1000 pinhole array matrix the sensor member 8 would need an array of 1000×1000 sensors, preferably formed by CMOS sensors, in order to simultaneously handle the reflected light. Moreover, since the mask 4 is moving, a sequence of 100 to 1000 z-slice images are generated during a single sweep operation of the scanning member. Since the whole scanning path of the mask 4 is about 3 mm long, this operation can easily be achieved within 100 msec, leading to a data rate of 1 to 10 billion pixels per second to be processed by the image processor. Even faster acquisition is possible in conjunction with still higher data rates, probably another factor of 10 can be achieved with a fast actuator and an extremely intense light source, requiring 10-100 billion pixels per second data rates. In this example a 1:1 objective 5 is assumed.

Figure 6:
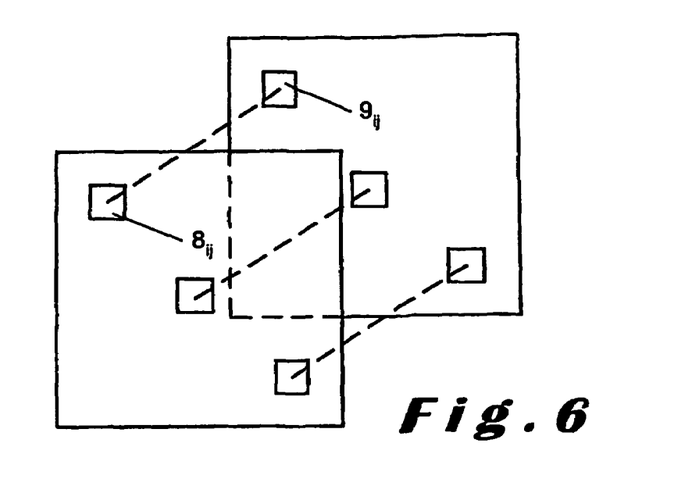
FIGS. 6 and 7 illustrate embodiments of the image sensing elements and processing elements.
Figure 7:
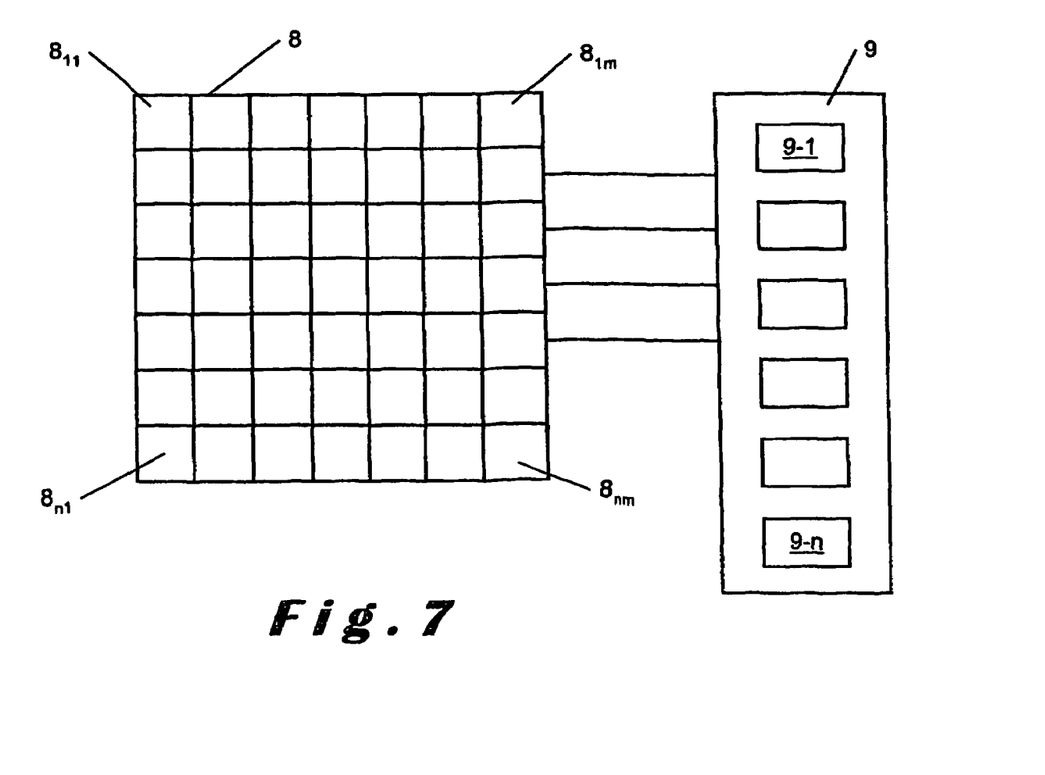

In order to process the different images acquired during a scanning operation of the mask, the photoelectric sensor member comprises a first array of sensing elements $8_{11}$-$8_{nm}$ and the image processor comprises a second array of processing elements 9 as shown in FIGS. 6 and 7. Each processing element of the second array being each time connected to a number of sensing elements of the first array. In the example illustrated in FIG. 6, there is a 1-1 relation between the sensing elements $8_{ij}$ ($1 \leq i \leq n$; $1 \leq j \leq m$) and the processing elements $9_{ij}$, i.e. to each sensing element there is connected a processing element, whereas in the example illustrated in FIG. 7 each processing element 9-I ($1 \leq l \leq p$) is connected to a group of sensing elements.

Consider now each pixel produced by a reflected light beam incident on one of the sensing elements independently and assume one processing element for each pixel. In this case during one scan of the scanning member 16, this pixel will see low light intensity most of the time and one maximum of intensity somewhere within the time interval used for the z-scan, approximately 100 msec as an example. The processing requires the determination of the point in time during the scan where the maximum occurred and thus where its confocal response signal was formed. The result per pixel is not any greyvalue or light intensity, but the timestamp indicating when the maximum occurred. The timestamp is indicative for the scanning member position. For each pixel, there is sufficient time for processing: assuming 1000 z-slices, the data rate is of only one value per 100 μsec, or 10 kHz since each pixel is considered independently. In essence, 1 million parallel processing elements are used in order to deal with the 10 billion pixel per second data rate. Due to the high z-sampling rate no special algorithm (e.g. interpolation) is required to determine the z-position at maximum intensity with an accuracy of a few microns.

There are many ways to implement this parallel processing. What is required is that the scanning signal generator 18 supplies the generated scanning signals to the processing elements 9. The scanning signal generator comprises for example a clock or time register and the clock pulses output by this clock are converted into scanning signals enabling a time controlled movement of the scanning member 16. By supplying the scanning signals to both the processing elements and the scanning member, the processing elements can follow the movement of the mask and establish a link between an obtained maximum light intensity and the position of the mask. The scanning signal is for example supplied in the form of a digital signal, for example a 10 bit signal, enabling to identify at least 1000 z-positions of the mask.

A possible processing algorithm executed by each image processing element comprises for example the following steps:

1. Initialise running maximum to zero or another initial intensity value and store as a stored intensity value the initial intensity value into a memory element of the processing element;

2. Under control of each of the subsequent scanning signals within a same series of scanning signals, compare the stored intensity value with the intensity value currently supplied by the sensing member. In the present example the comparison is executed every 100 μsec. The comparison itself is for example realised based on a greyvalue;

3. If the current intensity value is higher than the stored one, the current intensity value is stored into the memory element overwriting thereby the stored value. Each time a storage operation is performed subsequent to a comparison, then the current scanning signal is also stored in order to timestamp the stored intensity value. If on the other hand the current intensity value is lower, or even equal, to the stored one, then the stored intensity value remains unchanged;

4. At the end of the scan, the stored scanning signals are readout from each of the processing elements. Since those scanning signals correspond to the position where a maximum intensity value was obtained, the position of the different points on the object is easily determined;

5. Optionally the stored maximum intensity values could also be readout. This would provide a standard video image of the object surface 6, taken under telecentric light condition.

There are several possibilities to physically implement the processing elements and the sensor elements. However at least 1000 processing elements would be required. With a data rate of one pixel per 100 nsec i.e. 10 MHz, the greyvalues of the pixels of one column could be processed. A digital processor with a clockrate of a few hundred MHz operating with a data memory of 1000 running maximum values and 1000 timestamp registers would perform the algorithm described here before. By using a higher pixel clock rate than 10 MHz, it would be possible to have several columns of the sensing elements share a same processing element.

Other implementations could also be used. For example instead of storing the maximum intensity value as a digital value, an analogous storage could be considered such as for example a voltage stored in a capacitor. The incoming pixel greyvalue corresponding to the light intensity would then also be supplied as a voltage value. The comparison operation such as presented under step 2 would then be executed as an analogue voltage comparison. The storage of the scanning signal providing the timestamp could be dynamic, i.e. one capacitor per bit. The decision step (3) would then be implemented as a set of switches controlled by the comparator. If the running maximum is to be updated, the switches lead the current of the running greyvalue to the capacitor and the current scanning signal to the local timestamp registers.

An alternative approach to the method described here before and using an intelligent CMOS sensor, is to use a parallel-readout very fast standard CMOS sensor without on-chip processing. This alternative is illustrated in FIG. 7. Assuming for example 64 parallel readout channels with a rate of 50 MHz each, the cumulated data rate is 3.2 billion pixels per second. In the present context this is to be regarded as rather slow. Using this sensing principle, one would weaken the confocal principle by reducing the numerical aperture of objective 5. This would result in a broader maximum of light intensity per pixel as a function of z position of pinhole array 4, for example like the dotted curve in FIG. 2. Due to the broader maximum, less dense sampling of z-positions would be feasible, with computational interpolation in between sampled z-position in order to achieve the desired few micron accuracy. Here, with about 100 samples at 30 μ z-spacing due to numerical interpolation one could also achieve few micron accuracy. Taking 100 samples at 3.2 billion pixels per second takes about 32 msec. This is compatible with the requirements of in-line measurement. The drawback of this method is the enormous volume of electronic equipment required to deal with the 64 parallel readout channels: 64 digitizers, 64 memory banks, and 64 processors are needed to do the required maximum calculation and interpolation. That is, one essentially needs 64 complete image processing systems; otherwise, the processing of 100 million pixels required in this approach would take too much time violating the requirements for in-line measurement. This complexity could be traded against acquisition time. With 16 channel parallel readout in above example 128 msec can still be achieved which is quite acceptable. The memory banks have to contain the data which are required for the numerical interpolation for each separate pixel. The size of the memory banks can be limited by storing only the intensity values in the neighbourhood of the maximum intensity, the maximum intensity itself and the timestamp (only 1 byte in this case because the number of z-slices is 100) corresponding to the maximum value for each pixel.

Suppose that five sample points (pixel greyvalues for different z positions) are used as data enabling an interpolation in order to obtain a maximum intensity value corresponding to the surface z-value. Because the scanning member operates mechanically, the pixel values arrive as a time sequence. Assume a z-scan of 100 images, the five sample points need to be found around the global maximum intensity value within the series of hundred values, independently for each x-y pixel location.

Figure 5:
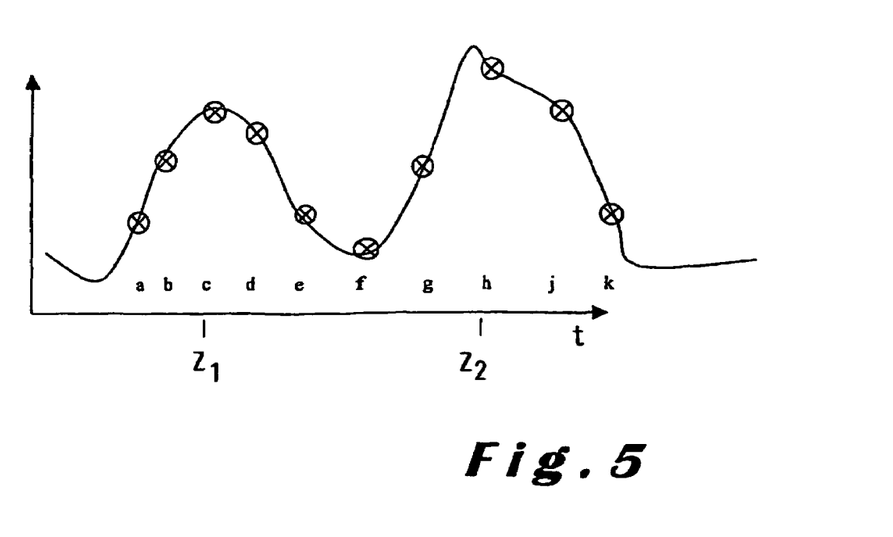
FIG. 5 illustrates a possible confocal z-response signal.

FIG. 5 illustrates an example of a confocal z-response curve for a single xy-pixel. As can be seen in this FIG. 5, there is a local maximum at z1 preceding the global maximum at z2 within the scan sequence. Because of side-lobes in the confocal response curve such local maximum are not exceptions and should be dealt with.

Since the time sequence corresponds to the z sequence or scanning direction, it may happen that five greyvalues (a-e) and their corresponding timestamp (z1) are stored in the memory whereas they correspond to the local and not to the global maximum. The subsequent two greyvalues (f and g) cause then a problem as it is not clear whether they belong to the global maximum or not. If they would not belong to the global maximum they could simply be ignored because they have a lower value than the greyvalues b, c or d. However if the greyvalue of f and g is required because they are part of the global maximum (f-k, z2), then they can't be ignored. Thus even if only five sample points are used, it is nevertheless necessary to foresee at least nine memory addresses (A, B, C, D, E, F, G, Z, J) five (A, B, C, D, E) for the current running local maximum, two (F, G) for the last two in the time sequence and one for a z-bit (Z) and another one (J) for a history flag as will be described hereinafter. The image processing member further needs an image sequence counter i which is common for all xy pixels within the field-of-view.

Figure 8:
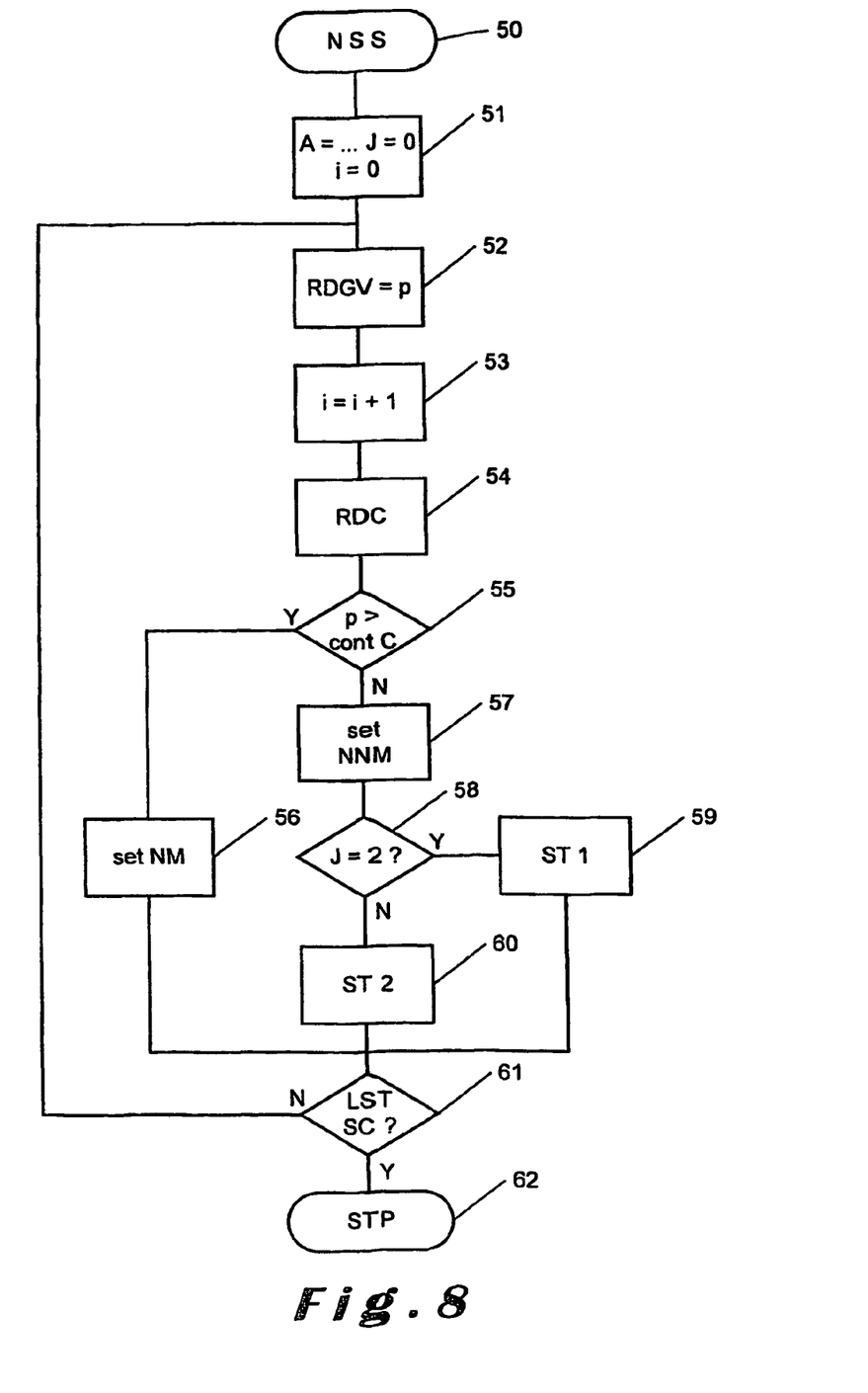
FIG. 8 illustrates by means of a flowchart a method for distinguishing a local and a global maximum from each other.
Figure 10:
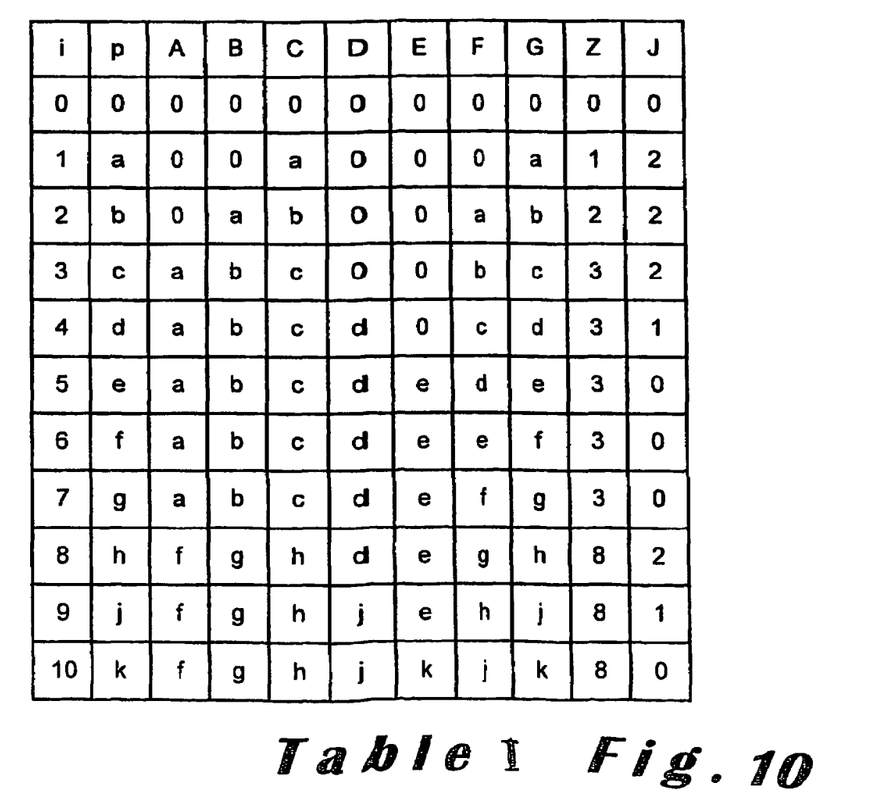
FIG. 10 shows a table with an example of a memory content.

The processing applied by the image processor uses an algorithm which is illustrated in FIG. 8 and will be described by using table I shown in FIG. 10.

As illustrated in FIG. 8, the algorithm comprises the following steps:

50. NSS: each time a new series of scanning signals is started, the algorithm is initialised by each of the image processing elements.
51. A= . . . J=0; i=0: each of the memory storage locations, A, B, C, D, E, F, G, Z and J, as well as the image sequence counter i are set to an initial value for example 0. This is illustrated in the second row of table I.
52. RDGV=p: the actually supplied greyvalue p, such as supplied by the sensing element is read by the image processing element for further processing.
53. i=i+1: the counter i is incremented by one unit as illustrated in column 1 of table I.
54. RDC: the value stored at memory location c is read.
55. p>cont c: the actual greyvalue p is compared with the greyvalue stored at memory location c. If p has a higher value (y) than the one stored at memory location c, then there is stepped to step 56. If on the other hand p has a lower or an equal value (N) than the one stored at memory location c, then step 57 is executed.
56. ST NM: because the actual greyvalue p was higher than the one stored at memory location c, this signifies that probably a new maximum value has been recognized, which implies a write operation into the memory location c. The following write operation is then performed A=F, B=G, C=p, Z=i, J=2, F=G and G=p. More details about this particular operation as well as of other write operations described in the subsequent steps will be given in the example described hereunder and referring to FIG. 5 and table I.
57. STNNM: because the actual greyvalue is lower than the one stored in memory location c, this actual greyvalue can not be considered as a maximum. The following write operation is then performed F=G, G=p.
58. J=2?: there is verified if J=2, indicating that during the preceding storage step a presumed maximum was found.
59. ST1: p is stored in memory location D (D=p) and J is decremented (J=J−1) if during step 58 J=2.
60. ST2: p is stored in memory location E (E=p) and J is decremented J=J−1 if during step 58 J≠2.
61. LST SC ?: there is verified if the actual scanning signal was the last one of a series of scanning signals.
62. STP: the routine executing the algorithm is finished if the actual scanning signal was the last one of the series.

Referring back to FIG. 5 and row three of table I, one can observe that if the actual received value p=a, i.e. the first greyvalue shown in FIG. 5, the counter i=1 since it is the first pixel value received. As at storage location C a greyvalue 0 is stored (C=0) and as a>0 (step 55), step 56 is executed. This means that at storage location C, the value a is stored (C=a). The values stored at F and G are shifted to A and B respectively, i.e. A=0, B=0. As a maximum is presumed J=2 and the value stored at G is shifted at F, i.e. F=0 whereas the actual greyvalue a is also stored at G (G=a). The fact that G is shifted at F and G=p is to enable to make a distinction between a local and a global maximum. Therefor, besides the five memory locations A to E, also F and G are reserved. Finally Z=1 indicating that at the first one of the scanning signals a maximum is presumed.

The next greyvalue i.e. greyvalue b is now considered and counter i is incremented to i=2 as is shown in the fourth row of table I. Since C=a and since b>a (step 55) the greyvalue is stored at C respectively G is overwritten by b (C=b). Greyvalue a stored at G is stored at B (B=a) and F=a. As greyvalue b is again a presumed maximum Z=i and thus Z=2 and J=2.

At the fifth row of table I the subsequent greyvalue c is considered. As C=b and c>b an analogous operation as described here before is executed leading to: i=3, A=a, B=b, C=c, F=b, G=c, Z=3, J=2.

The subsequent greyvalue d (see the sixth row of table I) will now be considered. Counter i is set to i=4 and since C=c and d<c (see FIG. 5), d is not considered as a maximum and therefor there is stepped to step 57 where F=G and G=p, i.e. F=c and G=d. Subsequently at step 58 there is established that the actually stored value at J=2 so that there is switched to step 59 where D=p as subsequent greyvalue and J=J−1 leading to D=d and J=1. As no new maximum greyvalue is found, Z remains unchanged.

Greyvalue e following greyvalue d is also smaller than greyvalue c stored at memory location C. Therefor step 57 is again executed leading to F=d and G=e. However at step 58, there is now established that J≠2 (J=1) so that there is continued with step 60. At this step J is decremented to J=0 and E=e as subsequent greyvalue. Again Z remains unchanged as no new maximum is recognised.

Reaching the next greyvalue f (i=6) there is established that f<c so that F=e and G=f. As J≠2 and J=0, J is not further decremented since only two greyvalues beyond the actual maximal value (c in the present example) are considered. J has a flag function enabling to identify the position of the considered greyvalue with respect to the actual maximum. Byte Z remains further unchanged as no new maximum is recognised.

The subsequent greyvalue to be considered is g (i=7). Although g>f, g is still smaller than the greyvalue c stored at C. Therefor F=f, G=g, J=0 and z remains Z=3 (steps 57, 58 and 60). Reaching however greyvalue h (i=8) this greyvalue is larger than greyvalue c stored at memory location C, so that at step 55 there is switched to step 56 leading to: A=f, B=g, C=h, J=2, F=g, and G=h. Since a new maximum is found, Z has to be adapted to Z=8.

The subsequent greyvalue J (i=9) is smaller than h, the actual maximum stored at memory location C. At step 57 F=h and G=j and at step 58 there is established that J=2. Therefor there is switched to step 59 where J=2-1 or J=1 and D=j. Z remains Z=8 is no new maximum recognised. Finally with greyvalue k (i=10) there is established that k<h and that J≠2. Therefor J is decreased to J=0 and F=j, G=k and E=k.

This signifies that at locations A to E the greyvalues f to k representing the global maximum are now stored and not a to e representing a local maximum. The present algorithm thus enables to recognise a local and a global maximum from one another and retain only the global maximum as confocal response signal. Moreover, by the storage of the Z value it is possible to retain also that scanning signal among the considered series that has led to the considered maximum and thus to determine the position of the mask and derive therefrom the required Z position of the object 6.

Once the scanning operation is determined and the necessary greyvalues are stored in the memory locations A to E and the maximum at 2, an interpolation operation is required to obtain the correct maximum value. Different algorithms can be used for this purpose. One possible algorithm is power-weighted-center-of-gravity $$Z\max = \frac{\sum_{u=1}^{5}(gv(u))^2 \cdot u}{\sum_{u=1}^{5}(gv(u))^2}$$

where u represents the greyvalues gv stored at the five memory locations A to E (A=1, ..., E=5).

This method provides similar output as the one using a processing element per sensing element. For each pixel one byte for the maximum intensity value and two bytes for the corresponding interpolated z-position (2 bytes are required because of the interpolation). Similar to the previous method, two maps can therefor be transferred to an image processing board, that can be situated externally or also integrated within the camera itself. One map contains the maximum intensity values for each pixel and another map contains the surface topography.

Another possible variation is the additional use of a 3D camera as a standard 2D camera. It might be considered useful that one could disregard the maximum formation and simply integrate pixel intensities over some time period corresponding to a standard integrating CMOS camera. Within one and the same mounting position within some manufacturing equipment one could thus acquire 2D or 3D images as desired.

The opposite choice also is possible. If readout of maximum greyvalue as discussed above is undesirable (for silicon layout or other specific implementation-related reasons for example) and the intelligent CMOS sensor would produce only the position of maximum, one could add a second beamsplitter into the arrangement of FIG. 1 and add a standard CMOS or CCD camera after this second beamsplitter. This camera would integrate light over the time of the entire z-scan. In this way the standard 2D image is obtained by this extra standard camera.

A further variant of the measurement device is obtained if light source 1 is replaced by a light source close to the object 6. In this case the set-up loses its confocal property and becomes a "depth through focus" sensor. Also, the image comprised of the maximum greyvalues during the z-scan corresponds to the normal 2D image for this second form of illumination. This might be useful since in this way images of object 6 may be acquired with differing types of illumination.

The invention claimed is:

1. A device for measuring in three dimensions a topographical shape of an object, said device comprising an arrayed confocal imaging system having a light source provided for illuminating said object and a light path diverging optical element, provided for diverging a path of illuminating light output by said light source and a path of reflected light reflected by said object, said confocal imaging system further comprises a confocal topographical mask provided for converting illuminating light coming out from said light path diverging optical element into an array of small spots, said confocal imaging system further comprises a confocal objective provided for orienting said illuminating light towards said object and said reflected light towards said confocal topographical mask in order to form a confocal image, said device further comprises a photoelectric sensor member provided to receive said reflected light having passed said confocal topographical mask and deflected by said light path diverging optical element and to convert the latter light into an intensity value, said device comprising also a scanning member on which said confocal topographical mask is mounted, said scanning member being provided for moving said confocal topographical mask over successive positions over a predetermined distance in order to modify a relative distance in a predetermined direction between said object and the object-position-in-focus, said device further comprises an image processor connected to said photoelectric sensor member and provided for forming a confocal response signal and calculating said object shape from said confocal images acquired at different relative distances in said predetermined direction between said object and the object-position-in-focus by said photoelectric sensor member, said confocal objective being provided for mapping at successive object-position-in-focus said array of small spots output at said successive positions, characterised in that said confocal objective is a 3D confocal objective mounted at a fixed position within said device.

2. A device as claimed in claim 1, characterised in that said 3D confocal objective is being designed in such a manner as to limit spherical aberration and coma in order to keep imaging errors in said confocal images at a maximum of two pixels.

3. A device as claimed in claim 1, characterised in that said confocal topographical mask is formed by a microlens array mounted on said scanning member and said device further comprises a single pinhole located at a focal point of said photoelectric sensor member.

4. A device as claimed in claim 3, characterised in that said single pinhole is located at a focal point of a two-stage camera objective placed in front of said photoelectric sensor, said single pinhole being mounted between said two-stage camera objective.

5. A device as claimed in claim 3, characterised in that said single pinhole is located in an optical path of said reflected light between a two-stage objective forming a sensor objective.

6. A device as claimed in claim 1, characterised in that said confocal topographical mask is formed by a pinhole array, each pinhole being provided with a microlens.

7. A device as claimed in claim 1, characterised in that said illumination source comprises a high-density LED array with a further microlens bonded on top of it.

8. A device as claimed in claim 1, characterised in that said illumination source comprises an array of laser diodes having an output coupled into a fibre-optic bundle.

9. A device as claimed in claim 1, characterised in that a linear polarizer is applied into said light path at an illumination side of said diverging optical element on which other side a quarter-wave plate and an analyser are applied.

10. A device as claimed in claim 1, characterised in that said scanning member comprises a scanning signal generator provided for generating a series of scanning signals indicative of said successive positions, said scanning signal generator being connected to said image processor for supplying said scanning signals thereto, said photoelectric sensor member comprising a first array of sensing elements, said image processor comprises a second array of processing elements, each processing element of said second array being each time connected to a number of sensing elements of said first array, said image processor being provided for receiving each time within a same series of scanning signals successive ones of said intensity values, each of said processing elements being provided for differentiating said successive intensity values among each other and retaining those intensity values forming said confocal response signal, said image processor being provided for associating to those intensity values, forming said confocal response signal, those scanning signals representing those positions having led to said confocal response signal.

11. A device as claimed in claim 10, characterised in that a sampling member is mounted between said first array of sensing elements and said second array of processing elements, said sampling member being provided for sampling at a predetermined sampling rate said intensity values and output at parallel read-out gates of said sensing elements, each of said processing elements having a memory element provided for storing intensity values sampled within a same series of scanning signals, each of said processing elements being provided for determining a maximum intensity value by interpolating the intensity values stored each time in a same one of said memory elements.

12. A device as claimed in claim 10, characterised in that said second array has at least a same number of elements as said first array, each processing element being provided for storing as a stored intensity value in an associated memory element an initial intensity value, said processing elements being provided for comparing, under control of each of the subsequent scanning signals, if the current intensity value is higher than the stored intensity value and for overwriting the stored intensity value if the latter is lower than the current intensity value, said processing elements being also provided for storing upon each storage operation the current one of the scanning signals.

13. A device as claimed in claim 1, characterised in that said scanning member comprises a voice-coil actuator connected to said confocal topographical mask and provided for imposing a linear movement to said mask.

14. A device as claimed in claim 13, characterised in that said voice-coil actuator is connected to an optical encoder provided to monitor said movement and for generating a displacement signal thereof, said optical encoder being connected to said scanning signal generator which is provided to generate said scanning signals from said displacement signal.

15. A device for measuring in three dimensions a topographical shape of an object, said device comprising an arrayed confocal imaging system having a light source provided for illuminating said object and a light path diverging optical element, provided for diverging a path of illuminating light output by said light source and a path of reflected light reflected by said object, said confocal imaging system further comprises a confocal topographical mask provided for converting illuminating light coming out from said light path diverging optical element into an array of small spots, said confocal imaging system further comprises a confocal objective, provided for orienting said illuminating light towards said object and said reflected light towards said confocal topographical mask in order to form a confocal image, said device further comprises a photoelectric sensor member, provided to receive said reflected light having passed said confocal topographical mask and deflected by said light path diverging optical element and to convert the latter light into an intensity value, said device comprising also a scanning member provided for modifying a relative distance in a predetermined direction between said object and the object-position-in-focus, said device further comprises an image processor connected to said photoelectric sensor member and provided for forming a confocal response signal and calculating said object shape from said confocal images acquired at different relative distances in said predetermined direction between said object and the object-position-in-focus by said photoelectric sensor member, said confocal objective comprises a first and a second part, said second part being fixed whereas said first part is mounted on said scanning member which is provided for moving said first part over successive positions in said predetermined direction over a predetermined distance, said first part being mounted near to said object, said confocal objective being provided for mapping at successive object-position-in-focus said array of small spots output at said successive positions characterised in that said confocal topographical mask is formed by a microlens array and said device further comprises a single pinhole located at a focal point of said photoelectric sensor member.

16. A device as claimed in claim 15, characterised in that a telecentric aperture is mounted between said first and second part.

17. A method for measuring in three dimensions a topographical shape of an object by means of an arrayed confocal imaging system, said method comprising an illumination of said object through a light path diverging optical element provided for diverging a path of illuminating light and a path of reflected light reflected by said object, said path of illuminating light crossing a confocal imaging system comprising a confocal topographical mask converting illuminating light coming out from said light path diverging optical element into an array of small spots, said small spots being oriented towards said object by a confocal objective which further orients said reflected light towards said confocal topographical mask in order to form a confocal image, said confocal image being supplied to a photoelectric sensor member after having passed said confocal topographical mask and being deflected by said light path diverging optical element, said photoelectric sensor converting the latter light into an intensity value, said method also comprises a scanning operation comprising a movement of said confocal topographical mask over successive positions in a predetermined direction over a predetermined distance in order to modify a relative distance in said predetermined direction between said object and the object-position-in-focus, said method further comprises an image processing wherein a confocal response signal is formed from data supplied by said photoelectric sensor member and wherein said object shape is calculated from said confocal images acquired at different relative distances in said predetermined direction between said object and the object-position-in-focus by said photoelectric sensor member, said confocal objective maps at successive object-position-in-focus said array of small spots output at said successive positions, characterised in that said confocal objective remains fixed during said scanning operation.

18. A method as claimed in claim 17, characterised in that said scanning operation comprises a generation of a series of scanning signals indicative of said successive positions and a supply thereof to said image processor, said image processing comprises a receipt, each time within a same series of scanning signals, of successive ones of said intensity values, said processing comprises a differentiating of said successive intensity values among each other and a retaining of those intensity values forming said confocal response signal, said image processor also comprises an association to those intensity values, forming said confocal response signal of those scanning signals representing those positions having led to said confocal response signal.

\* \* \* \* \*